G. F. BUENTE & H. C. FLING.
SAFETY SIGNAL FOR VEHICLES.
APPLICATION FILED FEB. 11, 1909.
1,007,671.
Patented Nov. 7, 1911.
2 SHEETS—SHEET 2.
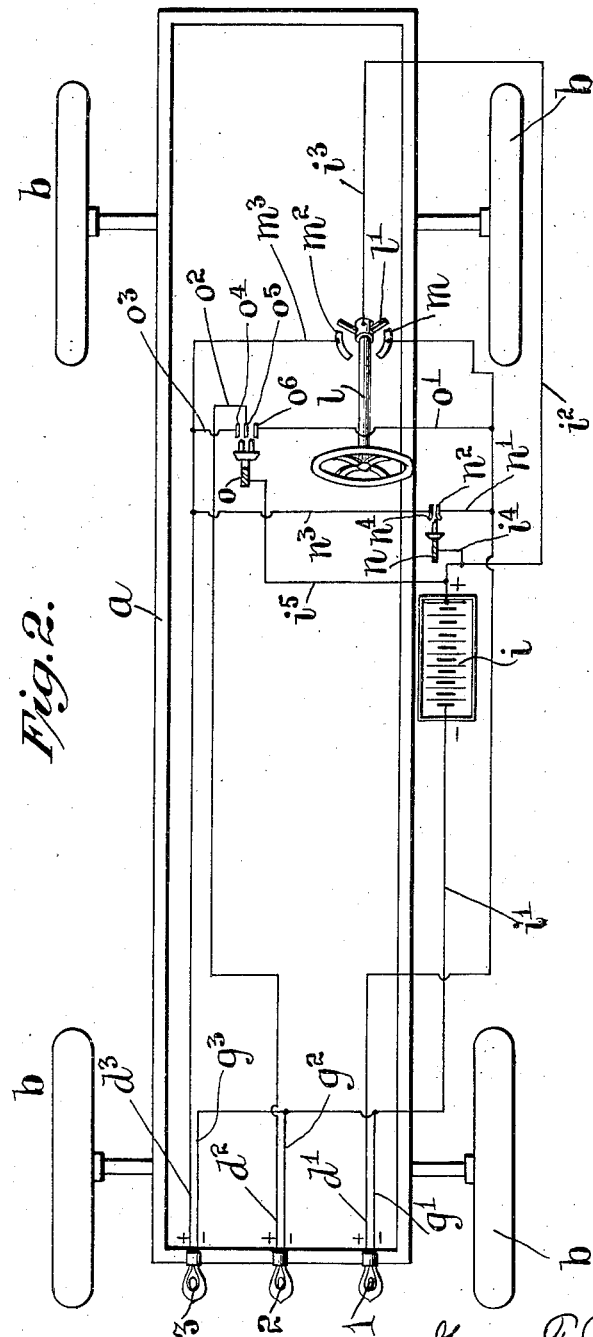
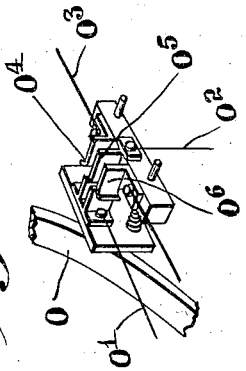
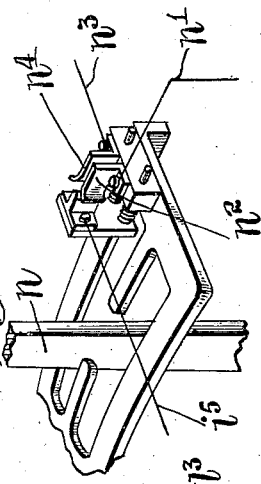
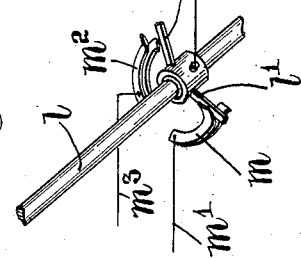
Attest:
Inventors:—
George F. Buente
Henry C. Fling
by Frank T. Wentworth
their Atty.

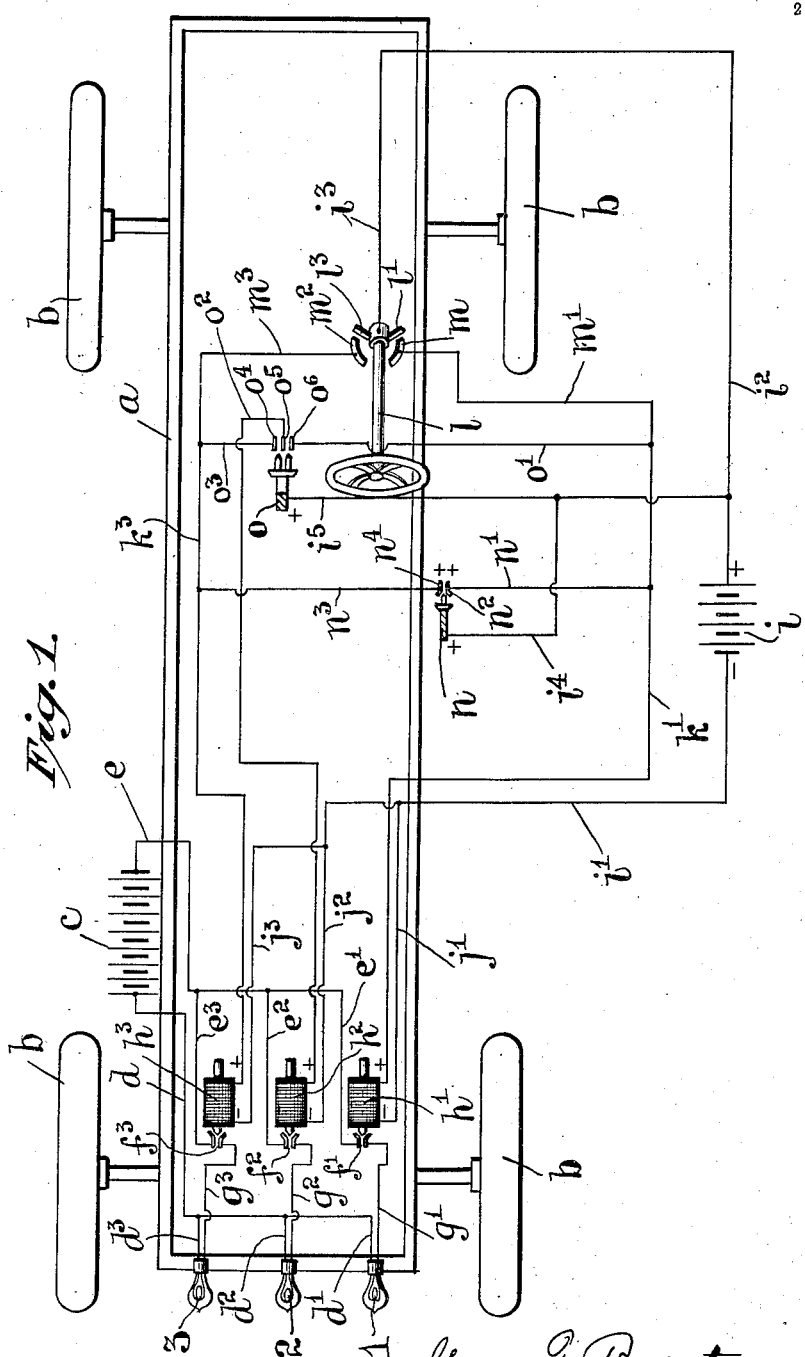

UNITED STATES PATENT OFFICE.

GEORGE F. BUENTE, OF NEW YORK, N. Y., AND HENRY C. FLING, OF SPRING LAKE, NEW JERSEY.

SAFETY-SIGNAL FOR VEHICLES.

1,007,671.     Specification of Letters Patent.    Patented Nov. 7, 1911.

Application filed February 11, 1909. Serial No. 477,377.

*To all whom it may concern:*

Be it known that we, GEORGE F. BUENTE and HENRY C. FLING, both citizens of the United States, and residing, respectively, in the borough of Brooklyn, city of New York, county of Kings, and State of New York, and Spring Lake, in the county of Monmouth and State of New Jersey, have invented certain new and useful Improvements in Safety-Signals for Vehicles, of which the following is a specification, reference being had therein to the accompanying drawings, which form a part thereof.

Our invention relates to safety signals for vehicles and more particularly to variable signals adapted to be carried by the vehicle itself.

The main object of the invention is to provide safety signals for vehicles which will automatically indicate the movements of the vehicle so that likelihood of accident will be reduced.

A further object is to provide safety signals, the operation of which will be automatically controlled through the mechanisms of the vehicle itself, thus causing the movements of the vehicle or of the mechanisms controlling such movements to instantaneously set signals indicating such movements.

A still further object is to provide safety signals of this character, which may be used to indicate any departure of the vehicle from a straight course; the stoppage of the vehicle; or a reverse movement thereof, all of which may be indicated without special attention of the driver to said signals.

A still further object is to provide visual safety signals such as electric lamps, the circuits to which will be closed by the steering gear; the brake mechanism, or the reversing mechanism of an automobile, in such manner as to cause the display of these lamps alone, or in various combinations, to indicate that the said mechanisms respectively are being used to change the speed, or the direction, of travel of the automobile.

A still further object is to provide safety signals which may be applied to any ordinary automobile without requiring any alterations or special mechanisms of the automobile aside from those incorporated in our said safety signal system.

A still further object is to provide safety signals set through electrical circuits, which circuits will contain therein suitable circuit closers or switches controlled by independent mechanisms actuated by electrical devices capable of being operated by low potential currents, the circuits to said electrical devices being controlled by the various mechanisms of the vehicle, in order that probability of the failure of the signals to operate through short circuits or imperfect contacts may be reduced to a minimum.

A still further object is to provide an electrical signal system for vehicles the wiring of which will be so simplified as to insure reliability in the setting of the signals.

The invention consists primarily in the combination in safety signals for vehicles of a plurality of tail lights, and means whereby said lights may be set individually or collectively to indicate the movements of the vehicle; and in such other novel features of construction and combination of parts as are hereinafter set forth and described, and more particularly pointed out in the claims hereto appended.

Referring to the drawings:—Figure 1 is a plan view of a skeleton automobile showing the application of our safety signal system thereto, the circuits, the controlling and relay batteries and the local circuit closers to the relay battery being shown diagrammatically. Fig. 2 is a similar view of a modified form of the invention in which the relay system is dispensed with; Fig. 3 is a detailed view of the switch mechanism or circuit closer actuated by the steering wheel; Fig. 4 is a detailed view of the switch mechanism or circuit closer actuated by the reversing lever, and Fig. 5 is a detailed view of the switch mechanism or circuit closer actuated by the brake mechanism.

Like letters refer to like parts throughout the several views.

Inasmuch as our invention will have its greatest field of utility in connection with automobiles, we have shown its application, in the drawings, to such a vehicle. With the increasing use of automobiles and their presence in large numbers upon highways and more particularly country roads, the element of danger of collision is substantial, particularly with vehicles moving in the same general direction but at varying speeds. This danger is greatly enhanced by the fact that most automobiles are capable of running at high speed and the range of the head lights is so limited, or the ordinary tonneau is sufficiently high as to make it impossible for the driver of one automobile following another to determine accurately the movement of the automobile preceding it. This element of danger can best be understood by considering the condition of two automobiles traveling at night on an unlighted road at high speed and fairly close together. Should a sudden emergency compel the leading automobile to stop suddenly, the driver of the following automobile would not be appraised in any way of this necessity and collision might result. Or in case the rear automobile should be driven at a higher rate of speed and desired to pass the other, a similar condition with the leader as to a vehicle preceding it, or through a violation of the rules of the road, might simultaneously turn in the path of the rear automobile without apprising the driver of the latter as to the intended movement. It will thus be observed that under such conditions a visual signal system which is controlled through the means controlling the movement of the automobile, would not only have the effect of apprising the driver of the following automobile of the intended movements of his leader, but would eliminate the possibility of a failure to set the signals or a mistake in setting same.

In the embodiment of our invention shown in the drawings, we employ three tail lights 1, 2 and 3, mounted in any suitable manner upon the vehicle which lights are on substantially the same horizontal plane, and are disposed at divergent points one adjacent to each side and one centrally of the vehicle. This arrangement, and number, of lights is that preferably employed, although in its broader aspect such are not material to the invention, as the lights may be grouped in any manner. By the manner described, however, the side lights 1 and 3 may be used to indicate the movement of the car to that side on which the light shows.

The body of the car is shown conventionally at $a$, the wheels thereof being shown at $b$. Further details of the car structure are not shown as involving a complication in the drawings which would tend to obscure the manner of applying our invention. Mounted on any part of the vehicle $a$ is a main battery $c$, which may consist of ordinary dry cells coupled in series parallel, or merely in series, to secure the requisite power to make the lights 1, 2 and 3 incandescent; or a storage battery may be employed. The exact type of battery is immaterial, this element being capable of being supplied by any one skilled in the electrical art. Leading from one pole of the battery $c$ is a wire $d$ having extensions $d'$ $d^2$ and $d^3$ coupled respectively to one terminal of each light 1, 2 and 3. The other pole of said battery is provided with a terminal wire $e$ having extensions $e'$ $e^2$ and $e^3$ leading respectively to one contact of one member of a knife switch, the opposed contacts being illustrated in the drawings at $f'$ $f^2$ and $f^3$ respectively. The construction of these contacts is not described in detail such being immaterial to the invention, it being merely necessary to provide a switch at this point which is normally opened. Leading from the other member of the contact $f'$ is a wire $g'$ leading to the other terminal of the lamp 1; leading from the other member of the contact $f^2$ is a wire $g^2$ in electrical connection with the other terminal of the lamp 2; and leading from the other member of the contact $f^3$ is a wire $g^3$, leading to and in electrical connection with the other terminal of the lamp 3. It will thus be observed that through the contact members $f'$ $f^2$ and $f^3$ the circuits to each of the lamps 1, 2 and 3, may be independently opened, or closed, thus permitting the lamps to be shown individually or in groups in any desired manner.

Mounted on the vehicle adjacent to the battery $c$ and the lamps 1, 2 and 3 are a plurality of solenoids $h'$ $h^2$ and $h^3$ the movable cores of which respectively form the other switch members opposed respectively to the members $f'$ $f^2$ and $f^3$. It will be observed that the circuit from the relay battery $c$ to the lamps 1, 2 and 3 may be closed through the solenoids or magnets $h'$ $h^2$ and $h^3$ which latter may be actuated by a battery of much lower potential than that required to make the lamps 1, 2 and 3 incandescent, thus minimizing the dangers of grounding the currents through the fouling of any of the contacts about the machine. This fouling might occur through moisture, dirt or other substances deposited on these parts during the ordinary use of the vehicle.

Carried in any desired manner on the vehicle is a main battery $i$ one terminal $i'$ of which is connected by extensions $j'$ $j^2$ and $j^3$ with one terminal of the solenoids $h'$ $h^2$ and $h^3$ respectively, thus wiring all of said solenoids relative to the battery $i$ in order that any, or all, of them may be placed in circuit therewith, singly or in groups.

In the operation of our signal system, to permit the grouping of the lights and their display in the desired manner, it is necessary that the balance of the wiring of said solenoids should be such as to permit any one of them to be placed in circuit with the battery $i$ or any group thereof according to the system of lighting used. As we have heretofore stated, in the system as at present contemplated, the lighting of the lamp 1.

will indicate that the vehicle is turning to the right; the lighting of lamp 3 will indicate that the vehicle is turning to the left; the lighting of all lamps 1, 2 and 3 will indicate that the vehicle is about to stop, and the continued display of the lamps 1 and 3 will indicate that the vehicle is about to reverse its movement, or is moving backward. With this system in mind, it is apparent that inasmuch as the lights are to be shown in accordance with the actuation of the various controlling mechanisms of the vehicle, the other terminals of the solenoids $h'$ $h^2$ and $h^3$ must be connected with the steering mechanism, as to the solenoids $h'$ and $h^3$ respectively; with the reverse mechanism, as to both the solenoids $h'$ $h^3$, and with the brake mechanism as to all three solenoids. The other terminal $i^2$ of the main line battery $i$ is in electrical connection with the members of a switch mechanism carried by the steering wheel or gear $l$ and properly insulated therefrom, by the extension $i^3$; with the reverse lever $n$ or a switch member adapted to be actuated thereby by the extension $i^4$; and with the brake lever $o$ or a switch member adapted to be actuated thereby by the extension $i^5$. It will thus be observed that the other terminal of the main line battery $i$ is in electrical connection with each of the three controlling mechanisms thus causing the closing of the circuit from said battery whenever any control whatever is exercised to vary the direction, or reduce the speed, of the vehicle.

Carried by the steering wheel $l$, and properly insulated therefrom and from the rest of the machine, are contacts $l'$ and $l^3$ in electrical connection with the main line battery $i$, as above described. These contacts extend radially of the axis of rotation of the said steering gear $l$. Mounted on the machine adjacent to the steering wheel $l$ and concentric with the axis of rotation thereof, are segmental contacts $m$ $m^2$ into contact with which the contacts $l'$ $l^3$ are adapted to be brought in case the wheel $l$ is turned in one direction or the other. It will be observed that when the wheel is in a position to hold a straight course, the right hand switch $l'$ $m$ and the left hand switch $l^3$ $m^2$ will both be open. Leading from the contact $m^2$ is an extension $m^3$ in electrical connection with the terminal $k^3$ of the solenoid $h^3$. Leading from the contact $m$ is an extension $m'$ in electrical connection with the terminal $k'$ of the solenoid $h'$. It is apparent that through the movement of the steering gear $l$, the circuit may be closed to either solenoid $h'$ or $h^3$, but under no circumstances to both such, thus permitting through the movement of the steering gear the setting of but one of the lamps 1 or 3 through the solenoids $h'$ $h^3$ at a time, the lamp set indicating that movement of the steering wheel necessary to change the course of the vehicle in the direction corresponding to the side on which the lamp is shown. It will also be observed that because of the length of the contact $m$ or $m^2$ the light in this lamp will continue to show until the vehicle has returned to the straight course.

Opposed to the reverse lever $n$, or the contact actuated thereby, are a pair of contacts $n^2$ $n^4$ in the nature of one member of a knife switch, except that the two parts $n^2$ $n^4$ of the sectional member are insulated from each other and in electrical connection respectively, through the extensions $n'$ $n^3$, with the terminals $k'$ $k^3$ of the solenoids $h'$ $h^3$ respectively. This manner of wiring is necessary to avoid the use of varying resistances in the circuits to the three lamps, in order that they may be lighted singly, or in selective groups, as above referred to. It will be observed that with this system of wiring, the solenoid $h'$ or $h^3$ may be placed in circuit alone, through the steering gear, the normal gap in the circuit controlled by the reverse lever preventing the closing of the circuit to one lamp also closing that to the other through the reverse mechanism.

Opposed to the brake lever $o$, or the contacts actuated thereby, is a switch member composed of three contacts $o^x$, $o^5$ and $o^6$ being in the nature of a double knife switch, all of which contacts are insulated from each other but adapted to be simultaneously closed by the actuation of the brake lever $o$, or the switch member actuated or carried thereby. The member $o^4$ is connected by an extension $o^3$ with the terminal $k^3$ of the solenoid $h^3$. The member $o^5$ is connected by the extension $o^2$ with the terminal $k^2$ of the solenoid $h^2$, and the member $o^6$ is electrically connected by the extension $o'$ with the terminal $k'$ of the solenoid $h'$. It will thus be observed that by the actuation of the brake lever the circuit will be simultaneously closed to each of the solenoids $h'$ $h^2$ and $h^3$ thus closing the circuit to each of the lamps 1, 2 and 3 simultaneously.

In the modification shown in Fig. 2 the arrangement differs from that of the preferred form merely in the respect that the extensions $m^3$ $n^3$ and $o^3$ are in direct electrical connection with the terminal $d^3$ of the lamp 3; the extensions $m'$ $n'$ and $o'$ are in direct electrical connection with the terminal $d'$ of the lamp 1, and the extension $o^2$ is in direct electrical connection with the terminal $d^2$ of the lamp 2, instead of with the terminals of solenoids controlling a relay battery, a single battery being used and the relay mechanism being entirely disposed of.

The operation of our herein described safety signals for vehicles is substantially as follows. In the installation of said signals the tail lights 1, 2 and 3 are supplemental to the customary fixed tail light and the said lights 1, 2 and 3 are, therefore, solely for the purpose of presenting rearwardly of the vehicle visual signals indicating the movements thereof. Assuming that the automobile or other vehicle is following a straight course, the various circuits controlled by the steering gear, the brake lever and the reverse lever will all be open and none of the lights 1, 2 or 3 will show. If, however, the steering gear is actuated to turn the vehicle to the left, the contact $l^3$ will engage the segmental contact $m^2$ closing the circuit $i^2$, $i^5$, $m^3$, $k^3$, $j^3$ and $i'$, to the battery $i$, which will actuate the solenoid or other magnet $h^3$. The actuation of this solenoid will close the switch $f^3$ thus closing the circuit $d$ $d^3$ $g^3$ $e^3$ and $e$ which circuit includes therein the lamp 3, and said lamp will be set substantially simultaneously with the initial movement of the steering gear to accomplish the turning of the vehicle. The lamp 3 will remain lighted as long as the contacts $l^3$ and $m^2$ are in electrical engagement with each other, thus apprising the driver of any following vehicle of the fact that the vehicle in front of him is about to turn or is turning to the left from the straight course. If the steering gear is turned so as to turn the vehicle to the right the contact $l'$ will engage the contact $m$ closing the circuit $i^2$ $i^3$ $m'$ $k'$ $j'$ and $i'$, thus actuating the magnet or solenoid $h'$ and setting the lamp 1 through the closure of the circuit $d$ $d'$ $g'$ $e'$ and $e$ through the switch $f'$. Instantly with the restoration of the steering gear to normal so as to cause the vehicle to follow a straight or substantially straight course the contacts $i^3$ and $m^2$ or $l'$ and $n$ will be disengaged and the circuits again opened, opening the circuits to the lamps 1 and 3 and thus showing no tail lights except the fixed tail light which forms no part of this system or invention.

From the foregoing it is apparent that the lights 1 and 3 will be set individually to indicate the direction in which the vehicle is being turned and in the setting of said signals, the lights will be controlled automatically from the steering itself, thus requiring no attention from the driver of the vehicle or no such attention or mechanisms which could lead to a mistake in the setting of the signals, with a resultant improper showing thereof. If the vehicle be slowed down or suddenly stopped, it may reasonably be assumed that such control of the vehicle would be through the brake lever, and that the lever is depressed to set the brake irrespective of the pressure exerted by said brake. When so depressed the lever $o$ or the switch mechanism carried thereby will simultaneously engage the contacts $o^4$ $o^5$ and $o^6$ and thereby close the circuits $i^2$ $i^5$ $o'$ $k'$ $j'$ and $i'$; $i^2$ $i^5$ $o^2$ $k^2$ $j^2$ and $i'$; and $i^2$ $i^6$ $o^3$ $k^3$ $j^3$ and $i'$, thus simultaneously actuating all of the solenoids or magnets $h'$ $h^2$ and $h^3$ closing all of the circuits from the relay battery $c$ and simultaneously lighting all of the lamps 1, 2 and 3. It will thus be observed that the driver of the following vehicle would, by a showing or flash of the three lights 1, 2 and 3, be apprised of the reduction in speed or stoppage of the preceding machine, it being apparent that, if desired, the three lights, by setting the brake, could be shown continuously while the vehicle is at rest. It being assumed that the three lights are being so shown, if the driver of the preceding vehicle should find it necessary to reverse, the brake would be released, cutting off the circuit to all of the lamps and the reversing lever $n$ would be thrown forward causing it, or the switch member carried thereby, to engage the contacts $n^2$ $n^4$ thus simultaneously closing the circuits $i^2$ $i^4$ $n'$ $k'$ $j'$ $i'$; and $i^2$ $i^4$ $n^3$ $k^3$ $j^3$ and $i'$, thus simultaneously closing the circuits to both solenoids or magnets $h'$ $h^3$, closing the circuits to the lamps 1 and 3, as heretofore described, controlled by the switches $f'$ and $f^3$ actuated by the solenoids or magnets $h'$ and $h^3$. It will thus be observed that the attention of the driver of a following vehicle would be attracted by the change of signals and thus be apprised of the initiation of the backward movement of the preceding machine.

In the modification shown in Fig. 2, the operation is substantially the same as that heretofore described, except that the movements of the steering gear $l$, brake lever $o$, or reverse lever $n$, closes the circuits directly to the lamps 1, 2 and 3, instead of the circuits actuating the solenoids $h'$ $h^2$ and $h^3$. From the diagrammatic showing of Fig. 2, the circuits in the modified form may be readily traced and a detailed description of such circuits will not, therefore be entered into.

As the signals used in connection with automobiles would have especial utility in the night time, we have described them as consisting of lights, although if desired, other forms of signals might be substituted therefor or used in conjunction therewith. A visual signal, would be, however, reasonably essential. While we have described a special wiring, such is designed solely for the purpose of economy and reliability and other appliances having the function of setting the tail lights or other signals individually or collectively might be used without departing from the spirit and scope of our invention.

When lights are used any desired color may be shown, the brilliancy and penetrating quality of the light rays being a matter to be considered, although the color shown by the actuation of the signals is immaterial to the invention.

Having described the invention, what we claim as new, and desire to have protected by Letters Patent, is:—

1. In safety signals for vehicles, three electric tail lights arranged adjacent to and intermediate the opposite sides of the vehicle, an electric battery, normally open circuits between said battery and said lights respectively, a circuit closer consisting of a plurality of contacts adjacent to the steering gear and a contact carried thereby adapted to engage either of said other contacts whereby said side lights may be set individually to indicate a change of course of the vehicle, and circuit closers adapted to be actuated by the reverse lever and the brake lever respectively, whereby the circuits to said lights may be closed to set them in different groups to indicate the stoppage or reversal of the vehicle.

2. In safety signals for vehicles, three electric tail lights arranged adjacent to and intermediate the opposite sides of the vehicle, an electric battery, normally open circuits between said battery and said lights respectively, a circuit closer consisting of a plurality of contacts adjacent to the steering gear and a contact carried thereby adapted to engage either of said contacts whereby the side lights may be set to indicate a change of course of the vehicle, a second circuit closer consisting of two contacts adjacent to the reverse lever and a contact carried thereby, whereby both of said side lights may be set simultaneously, and three contacts adjacent to the brake lever and a contact carried thereby, whereby the circuits to all three lights may be simultaneously set.

3. In safety signals for vehicles, a plurality of electrically operated circuit closers, an electric battery, normally open circuits between said battery and said circuit closers respectively, a circuit closer consisting of a plurality of contacts adjacent to the steering gear, and a contact carried thereby adapted to engage either of said other contacts whereby either of said circuit closers will be set individually to indicate a change of course of the vehicle, and a circuit closer adapted to be actuated by the other controlling mechanisms of the vehicle, whereby the circuits to a plurality of said electrically operated circuit closers may be simultaneously closed, to indicate the actuation of said other controlling mechanisms, of a plurality of electric tail lights arranged adjacent to the opposite sides of the vehicle, a relay battery, and normally open circuits between said lights respectively and said battery, adapted to be closed by said electrically operated circuit closers, respectively.

4. In safety signals for vehicles, a plurality of electrically operated circuit closers, an electric battery, normally open circuits between said battery and said circuit closers respectively, a circuit closer consisting of a plurality of contacts adjacent to the steering gear and a contact carried thereby adapted to engage either of said other contacts, whereby said electrically operated circuit closers may be energized individually to indicate a change of course of the vehicle, circuit closers adapted to be actuated by the reverse lever and the brake lever respectively, whereby the circuits to said electrically operated circuit closers may be closed in different groups to indicate the stoppage or reversal of the vehicle, of a plurality of electric tail lights arranged adjacent to and intermediate the opposite sides of the vehicle, a relay battery, and normally open circuits between said battery and said lights respectively, adapted to be closed by said electrically operated circuit closers.

5. In safety signals for vehicles, three electrically operated circuit closers, an electric battery, normally open circuits between said battery and said circuit closers respectively, a circuit closer consisting of a plurality of contacts adjacent to the steering gear and a contact carried thereby adapted to engage either of said contacts, whereby said electrically operated circuit closers may be energized to indicate a change of course of the vehicle, a second circuit closer consisting of two contacts adjacent to the reverse lever, and a contact carried thereby, whereby two of said circuit closers may be energized simultaneously, and three contacts adjacent to the brake lever and a contact carried thereby whereby all of said circuit closers may be simultaneously energized, of three electric tail lights arranged adjacent to and intermediate the opposite sides of a vehicle, a relay battery, and normally open circuits between said battery and said lights respectively adapted to be closed by the actuation of said electrically operated circuit closers respectively, whereby the actuation of said electric circuit closers by the closing of the circuits by the steering gear, the reverse lever, or the brake lever, will set said side lights individually or collectively in different groups, to indicate a change of course of the vehicle, or the stoppage or reversal thereof.

In witness whereof we have hereunto affixed our signatures this 8th day of February, 1909, in the presence of two witnesses.

GEORGE F. BUENTE.
HENRY C. FLING.

Witnesses to both signatures:
P. FRANK SONNEK,
P. V. WENING.